(12) United States Patent
Godfrey et al.

(10) Patent No.: US 7,300,099 B2
(45) Date of Patent: Nov. 27, 2007

(54) CLIP IN STRUCTURAL LOAD TRANSFER MEMBER

(75) Inventors: Peter R. Godfrey, Northville, MI (US); Brett Giem, Oxford, MI (US)

(73) Assignee: Chrysler LLC, Auburn Hills, MI (US)

( * ) Notice: Subject to any disclaimer, the term of this patent is extended or adjusted under 35 U.S.C. 154(b) by 124 days.

(21) Appl. No.: 11/315,656

(22) Filed: Dec. 22, 2005

(65) Prior Publication Data

US 2007/0145778 A1 Jun. 28, 2007

(51) Int. Cl.
*B60N 3/00* (2006.01)

(52) U.S. Cl. .................................. 296/187.12

(58) Field of Classification Search ........... 296/187.12, 296/187.01, 187.03, 203.01, 204, 205, 203.03, 296/209
See application file for complete search history.

(56) References Cited

U.S. PATENT DOCUMENTS

| | | | |
|---|---|---|---|
| 4,307,911 A | | 12/1981 | Pavlik |
| 5,226,696 A | * | 7/1993 | Klages et al. .......... 296/203.01 |
| 5,297,841 A | * | 3/1994 | Siedlecki .................. 296/146.6 |
| 5,306,068 A | * | 4/1994 | Nakae et al. ........... 296/187.12 |
| 5,806,919 A | * | 9/1998 | Davies ........................ 296/205 |
| 5,914,163 A | * | 6/1999 | Browne ...................... 428/36.1 |
| 6,135,542 A | * | 10/2000 | Emmelmann et al. ....... 296/205 |
| 6,299,240 B1 | * | 10/2001 | Schroeder et al. ..... 296/203.01 |
| 6,468,226 B1 | * | 10/2002 | McIntyre, IV .............. 600/564 |
| 6,601,886 B1 | * | 8/2003 | Thayer ....................... 293/133 |
| 6,928,736 B2 | | 8/2005 | Czaplicki et al. |
| 2003/0090129 A1 | * | 5/2003 | Riley et al. ............. 296/203.03 |
| 2003/0094835 A1 | * | 5/2003 | Yoshida et al. ............. 296/209 |
| 2004/0201258 A1 | * | 10/2004 | Daniere et al. ......... 296/203.02 |
| 2007/0052260 A1 | * | 3/2007 | Lassl et al. ............. 296/187.12 |
| 2007/0063543 A1 | * | 3/2007 | Roccato et al. ......... 296/187.08 |
| 2007/0096507 A1 | * | 5/2007 | Brunner et al. ........ 296/187.12 |
| 2007/0152474 A1 | * | 7/2007 | Lassl et al. ............. 296/187.12 |

* cited by examiner

*Primary Examiner*—H Gutman
(74) *Attorney, Agent, or Firm*—Ralph E. Smith

(57) ABSTRACT

A structural load transfer member for a vehicle including a housing having a first open end, a second open end, and a central bore. A first end member having an inner side is attached to the housing and an outer side of the first end member is attached to a sill of the vehicle. A second end member having an inner side is attached to the housing and an outer side is attached to a frame rail of the vehicle.

14 Claims, 2 Drawing Sheets

CLIP IN STRUCTURAL LOAD TRANSFER MEMBER

FIELD OF THE INVENTION

The present invention relates to body structure for a motor vehicle and, more particularly, to a structural member capable of effectively absorbing impact loads upon a side impact event.

BACKGROUND OF THE INVENTION

Various structures exist for absorbing or deflecting loads imposed on a motor vehicle during a side impact event. For example, U.S. Pat. No. 4,307,911 to Pavlik et al. discloses a horizontal beam extending between the front and rear of a vehicle door to increase the structural stiffness of a vehicle door. While such structural reinforcement members are generally known in the prior art, often these structures tend to add undesirable weight to the vehicle frame. Other structural reinforcement members in the prior art include complex configurations that require welding or mechanical fasteners to attach the structural reinforcement member to the vehicle frame.

Therefore, there exists a need for a structural reinforcement member for a vehicle that is lightweight and easily installed during the manufacturing process.

SUMMARY OF THE INVENTION

Accordingly, one aspect of the present invention provides a lightweight, easily installed structural load transfer member for reinforcing the frame of a vehicle, wherein the structural load transfer member includes a first open end, a second open end, and a central bore. A first end member having an inner side is attached to the housing and an outer side of the first end member is attached to a sill of the vehicle. A second end member having an inner side is attached to the housing and an outer side is attached to a frame rail of the vehicle.

Another aspect of the present invention provides a vehicle having at least one frame rail, a sill, and a structural load transfer member including a first open end, a second open end, and a central bore. A first end member having an inner side is attached to the housing and an outer side of the first end member is attached to a sill of the vehicle. A second end member having an inner side is attached to the housing and an outer side is attached to a frame rail of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
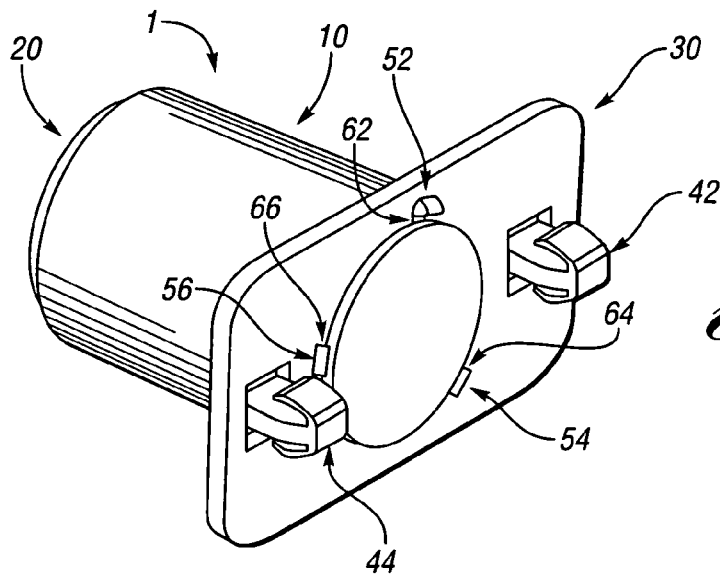
FIG. 1 is a perspective view of a structural member according to the present invention.
Figure 2:
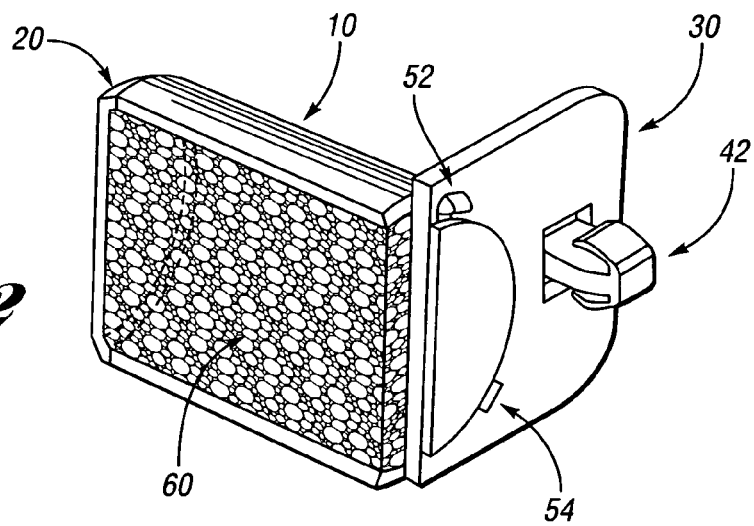
FIG. 2 is a perspective, partially sectioned view of a structural member according to a first exemplary embodiment of the present invention.

Turning now to the drawings, FIGS. 1 and 2 show a structural reinforcement member 1 having a housing 10, a first end member 20 and a second end member 30 according to a first exemplary embodiment of the present invention. As shown in FIG. 1, according to an exemplary embodiment of the present invention, the housing 10 is hollow and generally cylindrical in shape. A first end member 20 is arranged to cover a first open end of the housing 10 is attached to a first open end of the housing 10. According to an exemplary embodiment, the first end member 20 is generally circular in shape and equal in diameter to the diameter across a first open end of the housing. However, those skilled in the art will appreciate that the first end member 20 may be one of a number of shapes including, for example, a square, rectangle, or oval. In an exemplary embodiment, the housing 10 is attached to the first end member 20 with adhesive as is known in the art.

A second end member 30 is arranged to cover a second open end of this housing 10 with a portion of its available surface area when attached to the opposing second open end of the housing 10. According to an exemplary embodiment, the second end member 30 is generally rectangular in shape. However, those skilled in the art will appreciate that the second end member 30 may be one of a number of shapes including, for example, a square, circle, or oval. In an exemplary embodiment, the housing 10 is attached to the second end member 30 with snap-in type clips 52, 54, and 56 integrally formed in and extending from the second open end of the housing 10. The clips 52, 54, and 56 are then inserted into corresponding openings 62, 64 and 66 provided in the second end member 30.

Figure 3:
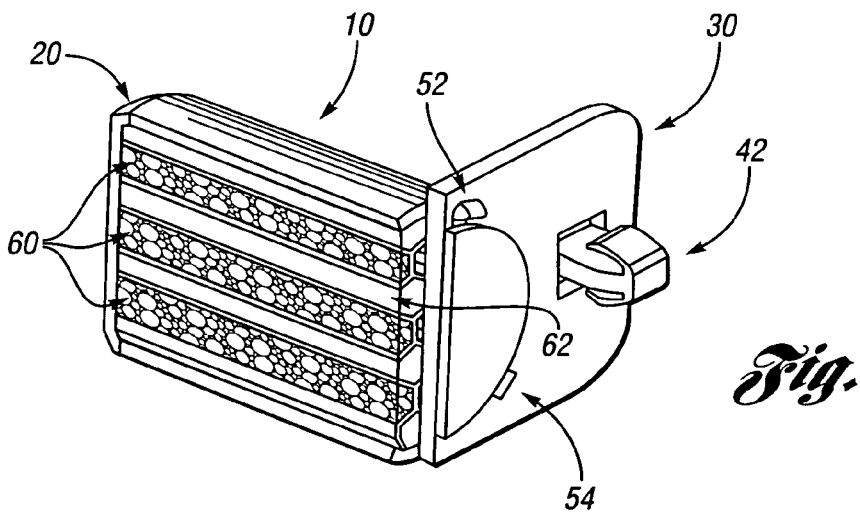
FIG. 3 is a perspective, partially sectioned view of a structural member according to a second exemplary embodiment of the present invention.

According to a first exemplary embodiment, a structural foam 60 may be used to fill the entirety of the housing 10. According to a second exemplary embodiment, a honeycomb structure or insert 62 is provided to fill housing 10 lengthwise as shown in FIG. 3. Structural foam 60 may be selectively used to fill the spaces formed in the honeycomb structure 62 to tune for vibration and noise characteristics of the structural reinforcement member 1.

Figure 4:
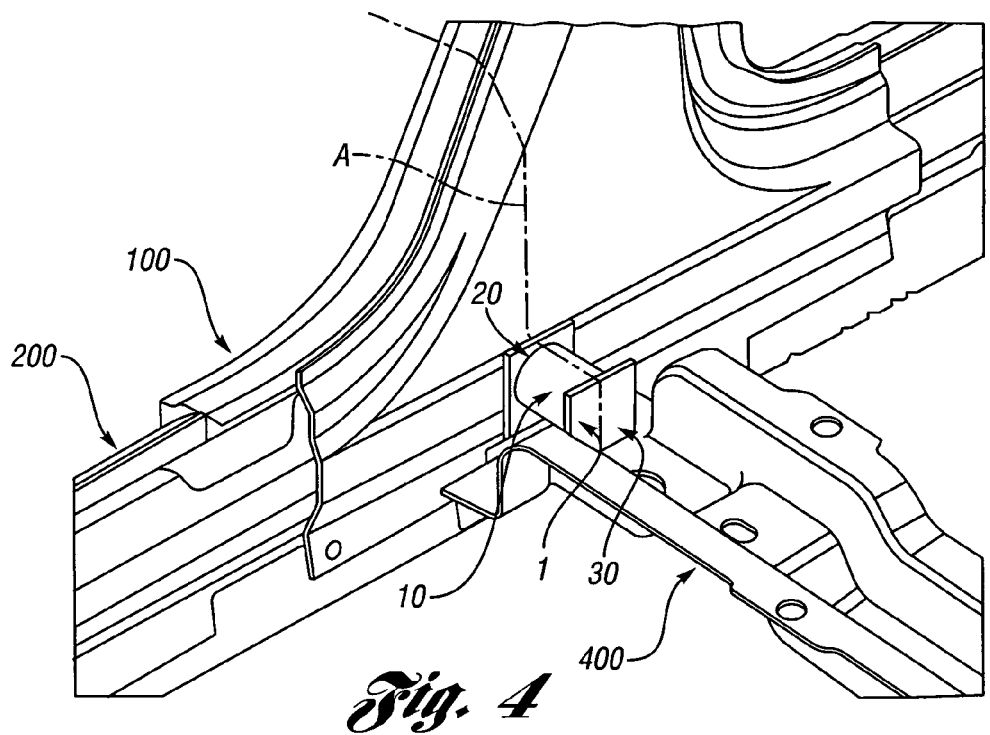
FIG. 4 is a perspective, partially sectioned view of a vehicle having a structural member according to the present invention.
Figure 5:
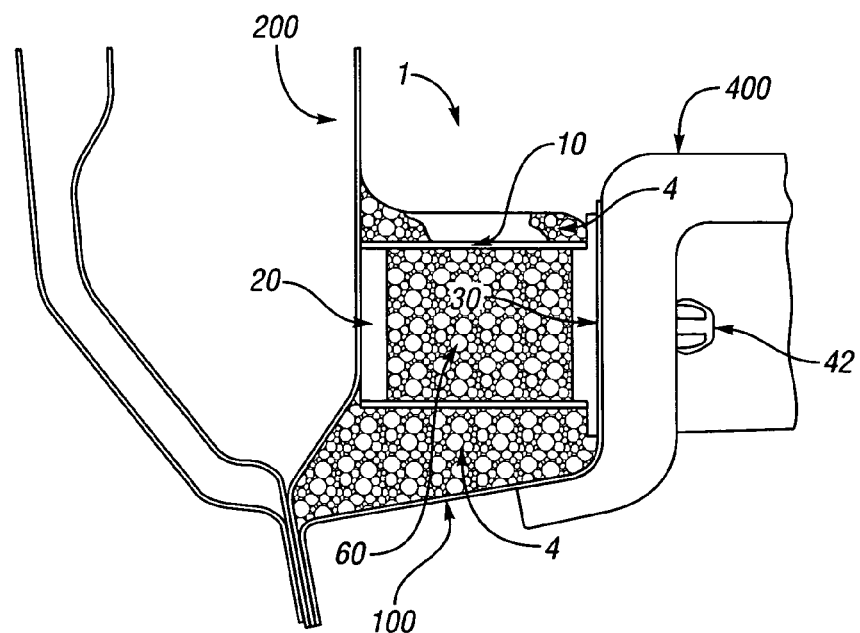
FIG. 5 is a frontal, partially sectioned view of a vehicle having a structural member according to the present invention.

As best shown in FIGS. 4 and 5, the vehicle includes a frame rail 400, inner sheet metal 200 and lower sheet metal 100 of a side sill of the vehicle. An adhesive is used to attach the first end member 20 of the structural reinforcement member 1 to the inner sheet metal 200 of the side sill of the vehicle. Those skilled in the art will appreciate that the first end member 20 may be attached to the vehicle by any adhesive known in the art such as, for example, a mastic pad applied to the exterior of the first end member 20. The second end member 30 of the structural reinforcement member 1 may be attached to the frame rail 400 of the vehicle with snap-in type clips 42 and 44 which are inserted into openings (not shown) formed in the frame rail 400. Structural foam 4 may also be injected between the structural reinforcement member 1 and the inner sheet metal 200 and lower sheet metal 100 of the side sill to provide additional support for the structural reinforcement member 1 in its desired position. Those skilled in the art will appreciate that a baffle material, such as expandable foam, may be substituted for the structural foam 4 to provide additional support for the structural reinforcement member 1 in its desired position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A structural load transfer member for a vehicle having a frame rail and a sill, said structural load transfer member comprising:
    a housing having a first open end, a second open end, and a central bore;
    a first end member having an inner side attached to said housing and an outer side arranged to be attached to said sill;
    a second end member having an inner side attached to said housing and an outer side arranged to be attached to said frame rail.

2. The structural load transfer member of claim 1 wherein said housing is cylindrical in shape and said first end member is circular in shape having a diameter equal to the diameter of the cylindrical housing.

3. The structural load transfer member of claim 1 wherein at least one clip attaches said second end member to said housing.

4. The structural load transfer member of claim 1 wherein at least one clip attaches said second end member to said frame rail.

5. The structural load transfer member of claim 1 wherein a structural foam is injected into said housing.

6. The structural load transfer member of claim 1 wherein said housing further includes a plurality of hollow chambers extending lengthwise within said housing.

7. The structural load transfer member of claim 6 wherein a structural foam is injected into at least one of said plurality of hollow chambers.

8. A vehicle, said vehicle comprising:
    at least one frame rail;
    a sill; and
    a structural load transfer member, wherein said structural load transfer member further comprises:
        a housing having a first open end, a second open end, and a central bore;
        a first end member having an inner side attached to said housing and an outer side arranged to be attached to said sill;
        a second end member having an inner side attached to said housing and an outer side arranged to be attached to said frame rail.

9. The vehicle of claim 8 wherein said housing is cylindrical in shape and said first end member is circular in shape having a diameter equal to the diameter of the cylindrical housing.

10. The vehicle of claim 8 wherein at least one clip attaches said second end member to said housing.

11. The vehicle of claim 8 wherein at least one clip attaches said second end member to said frame rail.

12. The vehicle of claim 8 wherein a structural foam is injected into said housing.

13. The vehicle of claim 8 wherein said housing further includes a plurality of hollow chambers extending lengthwise within said housing.

14. The vehicle of claim 13 wherein a structural foam is injected into at least one of said plurality of hollow chambers.

* * * * *